Patented June 20, 1939

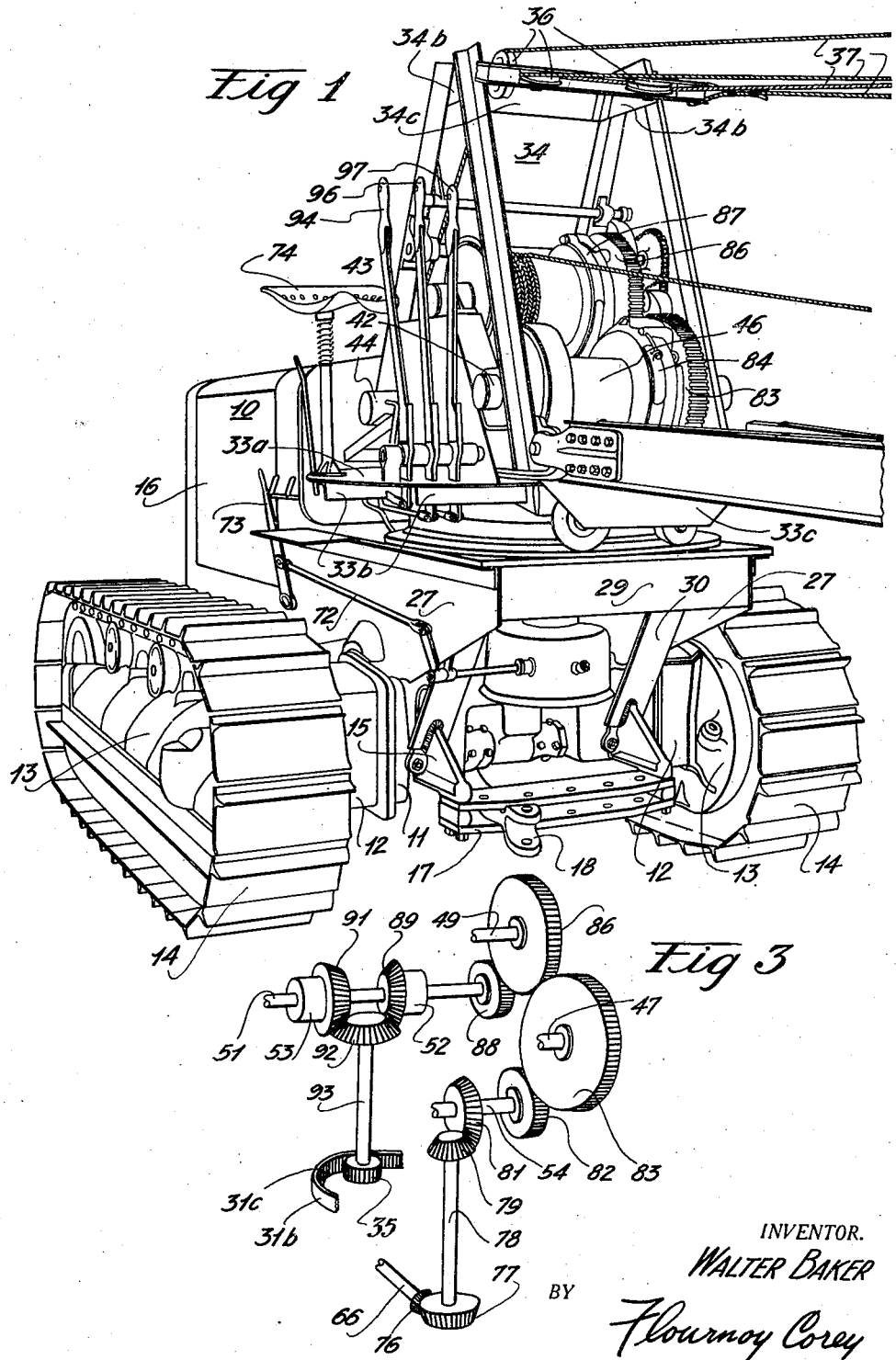

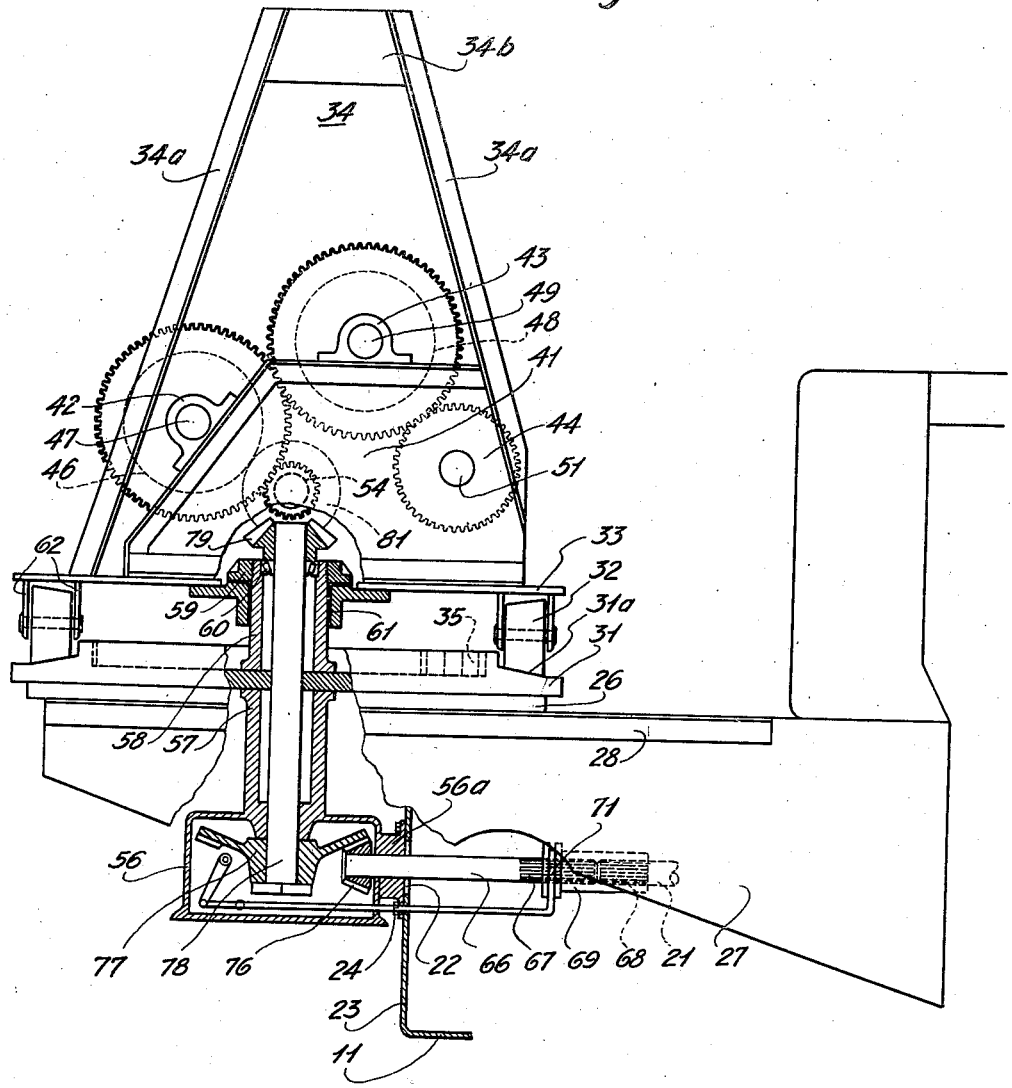

2,162,994

UNITED STATES PATENT OFFICE 2,162,994

EXCAVATING SHOVEL

Walter Baker, Cedar Rapids, Iowa, assignor to Speeder Machinery Corporation, Cedar Rapids, Iowa, a corporation of Iowa Application January 10, 1935, Serial No. 1,143

3 Claims. (Cl. 212—38)

This invention relates to excavating shovels and has particular relation to means for mounting such a shovel on a tractor and means for driving the shovel from the tractor motor.

It is, of course, old in the art to mount an excavating shovel on a mobile base such as a frame work or chassis having motor driven endless tracks thereon, or on a barge or the like, but it is the usual practice either to employ separate prime mover power means for driving the shovel and for moving the chassis or to employ a special power take off from the chassis moving power means for driving the shovel. In the latter case relatively long chassis frames were employed and the machines were in the nature of special units designed for the one purpose.

It is customary at the present time for several tractor manufacturers to build a more or less standardized tractor having means whereby pumps and the like may be driven from the tractor motor. In tractors of this description the transmission case of the tractor usually constitutes also the main frame or chassis with the drive axle and drive wheels mounted on the case at the rear thereof and the driving motor crank case mounted at the front thereof. In order that pumps and the like may be driven from the tractor motor, it is usually customary to provide a shaft in the transmission case which is driven by the motor and which extends to a position near the rear wall of the transmission case. An opening is provided in the rear wall of the transmission case and means are provided on the wall for the attachment of pumps and the like. The pumps or like mechanisms have means for engaging the drive shaft above mentioned.

I have observed the desirability of providing an excavating shovel unit which may be mounted on the ordinary tractor and driven by the power take off means ordinarily supplied with such tractors.

It is the general object of my invention to provide means for mounting an excavating shovel on the top of the transmission case of a tractor of the above character and to provide means in the excavating shovel mounting means whereby the power take off of the tractor may be readily utilized with a minimum of shafting for driving the rotating parts of the excavating shovel.

Other and further features and objects of my invention will be more apparent to those skilled in the art upon a consideration of the accompanying drawings and following specification, wherein is disclosed an exemplary embodiment of the invention, with the understanding, however, that such changes may be made therein as fall within the scope of the appended claims without departing from the spirit of the invention. The device may be used or adapted for use for other purposes.

In said drawings:

Figure 1 is a view in perspective showing an excavating shovel mounted on a tractor in accordance with one embodiment of my invention.

Figure 2 is a view, partly in elevation and partly in section, showing means whereby the excavating shovel is mounted on the tractor and showing also the drive gearing for driving the rotating parts of the excavating shovel; and Figure 3 is a diagrammatic view illustrating the drive gearing of the device shown in Figures 1 and 2.

While I have illustrated and described my invention in connection with an excavating shovel structure it is apparent that the invention is applicable to many types of excavators, cranes and the like such as clam shell cranes, lifting cranes, drag line shovels and excavating shovels and so on, and wherever I use the term "excavating shovel" all similar structures are included.

Referring now to the drawings a tractor of the type for which my excavating shovel and shovel mounting means is particularly well adapted is indicated generally by the numeral 10. The tractor here shown has a heavy, substantially rectangular or box-like transmission 11 in which the drive gearing, by which power from the motor is conveyed to the wheels, is mounted. The housing 11 is quite large and strong as it serves not only as a transmission case but also as a chassis on which the motor and wheel driving axles are mounted.

The housing not only serves as a case for the forward and reverse drive gearings but also serves as a case for the steering mechanism of the tractor. Tractors of this character are generally steered by independently driving the wheels on one side or the other. The housing serves also as a bearing for the drive axles and as a main frame to which the box-like drive axle housings 12 are secured, one on each side of the gear housing. Tractor sub-frames 13 are secured in opposed relation, one on each side of the tractor and to the axle housings 12. The axles drive wheels which in turn drive endless treads 14 in accordance with the usual practice. The drive motor is mounted at the front of the housing under the hood 16 and the drive motor crank case is secured to the front of the drive gear housing 11 also in accordance with the usual construction. Draw bar guide support brackets 15, draw bar guides 17, and draw bar 18 are usually mounted on the rear lower face of the gear housing 11.

The transmission case 11 of the tractor is ordinarily provided with a power take-off shaft as illustrated at 21 in Figure 2 and this power take-off shaft usually extends longitudinally of the tractor. An opening 22 is provided in the rear wall 23 of the transmission case 11 in line with the axis of the take-off shaft 21 and studs 24 are provided in circular position about this opening.

In practicing my invention I provide a heavy cover plate 26 adapted to be fitted over the rear portion of the upper face of the transmission case or housing 11 and a pair of roughly triangular side plates 27 bolted one to each side of the transmission housing. A pair of long angle irons 28 are bolted or otherwise secured to the upper outer faces of the side plates or frames 27 and to the lower face of the plate 26. The extreme outer ends of the side plates 27 are connected by means of a cross plate 29 to thereby afford a strong substantial frame upon which the turntable of an excavation shovel constructed according to my invention may be mounted. The frame is additionally braced by means of braces 30 extending from the draw bar guide support brackets 15 to the plate 26.

A heavy "bull ring" 31 is mounted on top the transmission case cover plate 26 and this bull ring 31 is provided with a sloping circular face 31a which affords a track upon which the rollers 32 of the turntable 33 may roll. The bull ring 31 likewise has a vertically extending flange 31b on the inner face thereof to afford means whereby a spur gear 35 of the turntable 33 may rotate the turntable about a vertical axis as hereinafter more particularly described. The turntable 33 is preferably comprised of a substantially circular horizontal plate 33a braced on the lower face thereof by angle irons 33b and 33c. A pair of "A" frames 34 are mounted on top the circular plate 33a and these "A" frames are comprised of the side members 34a connected at the top by plates 34b and 34c. The "A" frames 34 thus form a support to which the pulleys 36 for the boom supporting cable 37 may be attached.

A pair of trapezoidal shaped pedestals 41 are placed on the plate 33a inside of the "A" frames 34 and these pedestals serve as bases upon which the bearings 42, 43 and 44 on a number of cross shafts are mounted. The pull back back drum 46 is rotatably mounted on a cross shaft 47 in bearings 42 and a hoisting drum 48 is rotatably mounted upon a cross shaft 49, which in turn is rotatably mounted on bearings 43. A bull ring cross shaft 51 is mounted for rotation in bearings 44, and a pair of opposed friction clutches 52 and 53 are mounted upon the cross shaft 51. A shovel drive cross shaft 54 is mounted within the pedestal 41 at substantially the central portion thereof.

A drum type horizontally disposed transmission case 56, which may be termed the shovel drive transmission case, is mounted on the rear wall 23 of the transmission case 11 by means of the stud bolts 24. An upwardly extending cylindrical portion 57 of the drive transmission case 56 is fastened at its lower end to the upper face of the drive transmission case and at its upper end to the lower face of the bull ring 31. A heavy collar 58 extends axially in line with the cylindrical member 57 up from the upper face of the bull ring plate 31 and through the circular plate 33.

This collar 58 is closed off at its upper end as indicated at 59 and an extremely heavy strong bushing 61 is secured to the under side of the circular plate 33 and in this manner is rotatably mounted on the collar 58. The plate 33 is arranged to permit the entire turntable to rotate about a vertical axis on the bearings 60 within the collar 59 and on the rollers 32 which are mounted on brackets 62 on the under side of the plate 33.

The horizontally extending bracket portion 56a of the shovel transmission case 56, by which the case is suspended on the rear wall of the transmission case 11, affords a bearing in which a short drive shaft 66 may be rotatably mounted. This drive shaft 66 is splined at one end as indicated at 67 and the take-off shaft 21 of the tractor is likewise splined as indicated at 68 to afford key ways for a sleeve coupling 69. The sleeve coupling 69 may be slid back and forth on the shaft 66 by means of a yoke 71 which engages a suitable groove in the coupling 69 and which is actuated by means of a shaft and lever system indicated at 72. The pull shaft and lever system ends in a control lever 73 adjacent the operator's station at 74 and thus the coupling may be disengaged when it is desirable to disengage the drive gearing from the motor.

A bevel pinion 76 is keyed to the shaft 66 within the shovel transmission case 56. A large bevel ring gear 77 is in mesh with the bevel pinion 76 and this ring gear is keyed to a stout vertical shaft 78 which passes upwardly through the upper face of the shovel transmission case 56, through the sleeves 57 and 58, and into a bevel pinion 79 at the upper end of the shaft. The bevel pinion 79 is meshed with another bevel gear 81 which is keyed to the cross shaft 54. It may be observed, at this point, that power from the power take off of the tractor has been conveyed up through the shovel turntable. The cross shaft 54 drives a pinion gear 82 which in turn is meshed with a large gear 83 which in turn is keyed to the cross shaft 47. A clutch mechanism 84 of usual construction may be employed in accordance with the usual practice to selectively drive or release the pull back drum 46. The spur gear 83 in turn is meshed with a spur gear 86 which is keyed to cross shaft 49 upon which the hoisting drum 48 is mounted and a clutch 87 is employed in accordance with the usual practice for disengaging and engaging the hoisting drum 48 to the shaft 49 and spur gear 86. The large spur gear 86 in turn is meshed with a smaller spur gear 88 which is keyed to the cross shaft 51. Bevel gears 89 and 91 are adapted to be selectively engaged by the friction drive clutches 52 or 53 and these bevel gears roll on a bull ring bevel gear 92. The bevel gear 92 is keyed to a vertical shaft 93 on the lower end of which a spur gear 35 is mounted and the spur gear 35 is in mesh with the internal gear teeth 31c of the bull ring 31b to effect rotation of the table.

It is now apparent that through the agency of the gearing described the power take-off of the tractor is employed to furnish power to the gearing system to convey torque directly from the motor to the pull back and the hoisting drums and to the table turning means. The gearing, including the spur gears 83, 86 and 88 and the bevel gears 89, 91 and 92 and spur gears 34 and 31, is of substantially the usual construction. Control of the various drums and drives for rotating the pull back drum, the hoisting drum, and the turntable drive is effected by means of control systems including the control levers 94, 96 and 97 in accordance with the usual practice.

It is apparent that I have provided an extremely compact strong simple mounting for mounting an excavating shovel on a tractor of conventional design and that I have provided a simple, effective, efficient and reliable drive means for driving the rotating parts of a shovel from the power take-off of a tractor.

I claim as my invention:

1. The combination with a "Caterpillar" type tractor characterized by the use of a tractor transmission case secured to the rear of the motor and mounting of the drive wheels and rear axle on the tractor transmission case to thus form the main base structure of the tractor, and the tractor transmission having a power take-off extending longitudinally of the tractor; of a shovel transmission case secured directly to the rear wall of the tractor transmission case in line with the power take-off, a turntable mounted above the shovel transmission case with the axis of rotation thereof to the rear of the tractor transmission case, and power transmitting means associated with the shovel transmission case for transmitting power from the power take-off of the tractor to the turntable.

2. The combination with a "Caterpillar" type tractor characterized by the use of a tractor transmission case which forms the main base structure of the motor, rear wheels and rear axle and the tractor transmission having a power take-off extending longitudinally of the tractor; of a shovel transmission case secured directly to the rear wall of the tractor transmission case, a turntable mounted above the tractor transmission case and projecting rearwardly beyond the rear wall of the tractor transmission case whereby the axis of rotation of the turntable is rearward of the rear wall of the tractor transmission case, and power transmitting means associated with the shovel transmission case for transmitting power from the power take-off of the tractor to the turntable.

3. The combination with a "Caterpillar" type tractor characterized by the use of a tractor transmission case which forms the main base structure of the motor and wheels, and the tractor transmission having a power take-off extending longitudinally of the tractor; of a shovel transmission case secured directly to the rear wall of the tractor transmission case, a turntable mounted above the shovel transmission case, a drive shaft extending rearwardly from the power take-off of the tractor transmission into the shovel transmission case, a vertical shaft extending from within the shovel transmission case into the turntable, and a bevel and ring gear assembly within the shovel transmission case for transmitting power from the power take-off to the vertical drive shaft.

WALTER BAKER.